Figure 1:
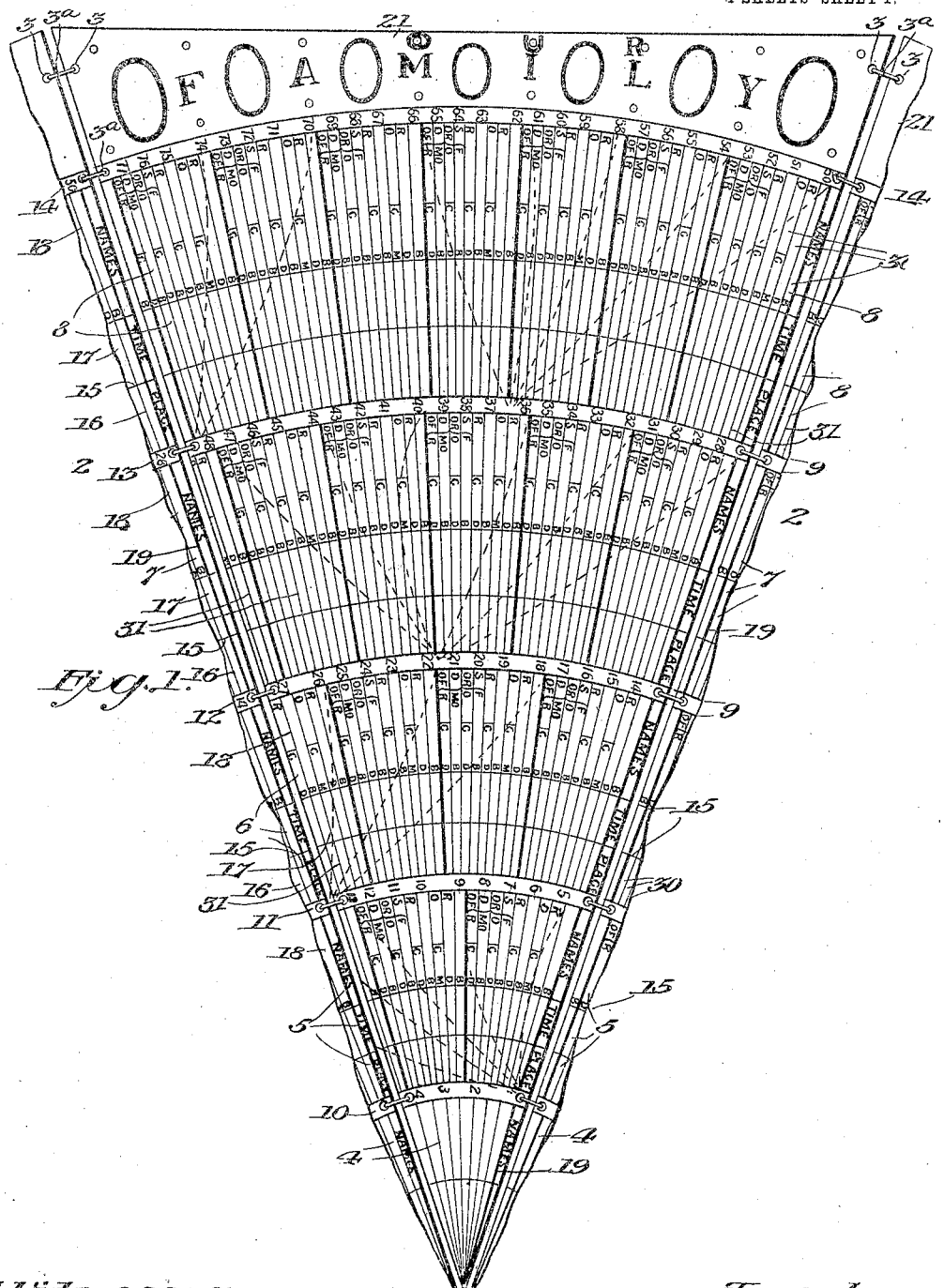

N. C. GRAY.
CHART.
APPLICATION FILED APR. 29, 1912.

1,058,859.

Patented Apr. 15, 1913.

4 SHEETS—SHEET 1.

Witnesses:
C. S. Richards
J. C. Ford

Inventor:
N. C. Gray
By H. Richards,
Atty.

N. C. GRAY.
CHART.
APPLICATION FILED APR. 29, 1912.

1,058,859.

Patented Apr. 15, 1913.
4 SHEETS—SHEET 2.

N. C. GRAY.
CHART.
APPLICATION FILED APR. 29, 1912.

1,058,859.

Patented Apr. 15, 1913.
4 SHEETS—SHEET 3.

N. C. GRAY.
CHART.
APPLICATION FILED APR. 29, 1912.

1,058,859.

Patented Apr. 15, 1913.
4 SHEETS—SHEET 4.

UNITED STATES PATENT OFFICE.

NORMAN C. GRAY, OF CHICAGO, ILLINOIS.

CHART.

1,058,859.

Specification of Letters Patent.   Patented Apr. 15, 1913.

Application filed April 29, 1912.   Serial No. 694,036.

*To all whom it may concern:*

Be it known that I, NORMAN C. GRAY, a citizen of the United States, and a resident of Chicago, in the county of Cook and State of Illinois, have invented a new and useful Chart, of which the following is a specification.

While my invention relates to charts in general, it is especially adapted for a genealogical chart or tree, in either an ascending or descending scale.

I am aware that charts for the above related purpose have heretofore been provided, but such as I have seen have not been so arranged and subdivided that full, complete and sufficient data could be written thereon; a sufficient number of indicated spaces were not provided; some have been too complex in their arrangement, rendering it difficult for a novice to fill in the records, and after having been filled in by an expert, difficult for an unskilled person to intelligently read, or to trace the line of ascent or descent; others have been of such size that they could not be conveniently filed away in small spaces, while others have been of such large area that the centrally located portions could not be conveniently brought within range of the eye.

One of the objects of my invention is to provide a chart on which a full, complete and satisfactory written enumeration of the genealogical data, history and biography of an ancestor or ancestors and his or their descendants (or, in fact, an individual or individuals and his or their descendants,) in the natural order of succession or antecedence, may readily be compiled, even by a novice.

Another object is to provide a chart of the nature described which is made up of a plurality of sections so joined or hinged together that they will fold one on top of another into a compact body which will occupy but a minimum of space. By reason of its being foldable it may be readily carried from place to place—a feature which will be appreciated by genealogists and others who have to frequently carry such charts from one library or other place of reference to another. In this connection it may be further stated that when so folded any portion of the chart may readily be brought into visual position for either compilation or examination.

A further object is to provide each of the several sections with suitably ruled lines which, as will be more fully hereinafter described, are in the form of concentric arcs of circles, each divided by radial lines, whereby a systematic chart is provided, and which may be tabulated, filled in and compiled even by a novice. In connection with this object, but subsidiary thereto, I have provided indicating characters and reference numerals, the purposes of which will be presently set forth.

A further object is to provide a chart which may be extended indefinitely; in other words, while it may be compiled up to a certain date by one individual, his descendants, after his decease, may add further data, there being sufficient spaces to permit of such additions.

A still further object is to provide a chart or table on which the complete genealogical record or data of at least five generations may be compiled in a clear, compact and concise form—one which may be readily scanned and observed, and without reference to other sheets or pages.

Another object is to provide improved means for securing the several sections of the chart together.

A further object is to provide photograph-holding means secured to the border of one or more of the sections, whereby likenesses of those enumerated may be presented.

In order that the invention may be fully understood I have hereto appended several figures of drawings illustrating my invention as arranged and embodied in the best way of which I have conceived.

Figure 2:
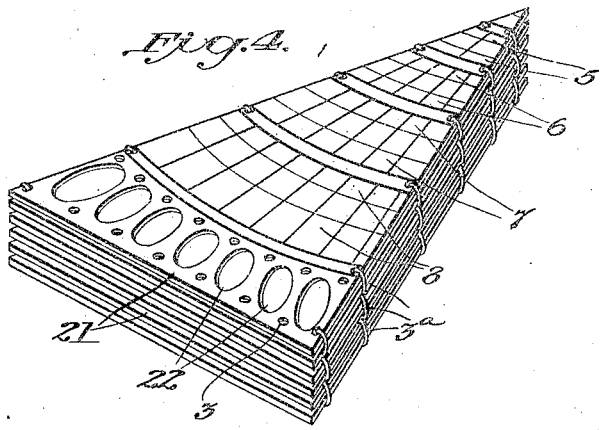
Figure 3:
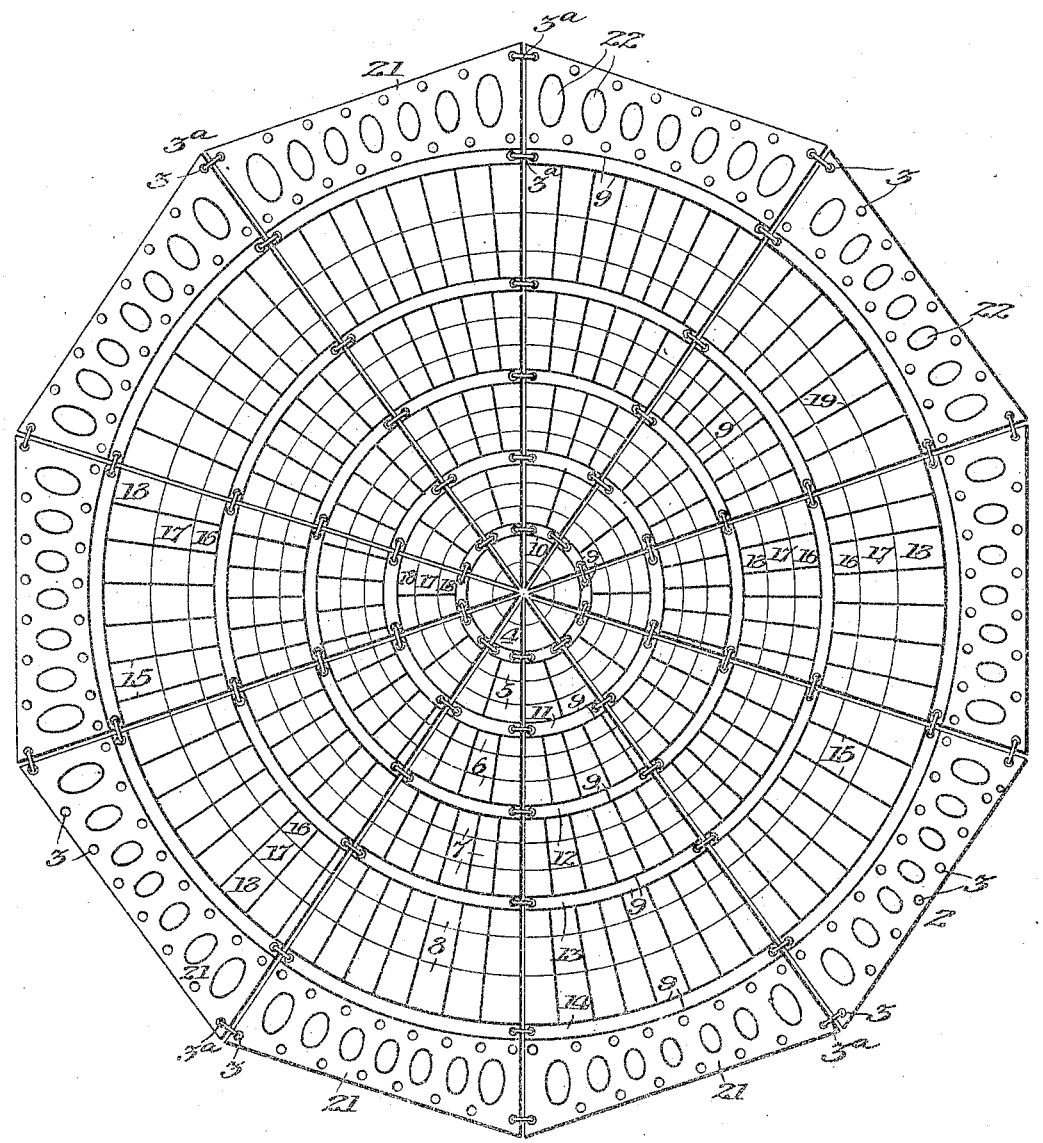
Figure 5:
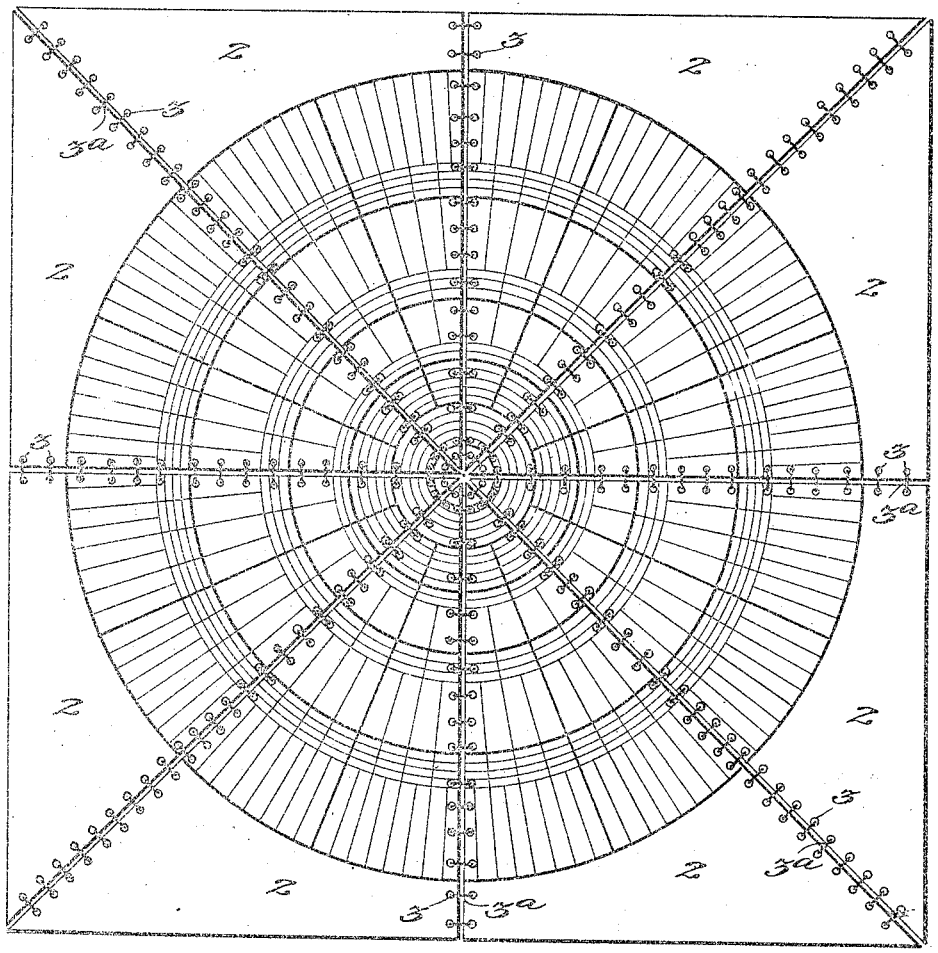

In said drawings: Figure 1 is a fragmental view of the chart as opened for inspection. In this view I have shown one section of the chart as complete, and have further shown dotted diagonal lines of reference— these being shown merely to illustrate the manner of indicating a certain line of descent. Fig. 2 is a plan, greatly enlarged, a fragmental detail compiled; Fig. 3, is a diagrammatic view, a plan, showing the chart unfolded; Fig. 4, a reduced perspective, showing the manner of folding the chart; Fig. 5, a plan, a modification; and Fig. 6, a reduced perspective of the chart illustrated in Fig. 5, but folded.

In the drawings the same reference character always indicates the same part.

2 indicates each section of the chart. These sections are shown as being each an isosceles triangle, and each has a series of apertures along its sides, each aperture being reinforced by a metallic eyelet 3. The adjacent pairs of eyelets are united by cords 3ª with the exception of those of two of the sections at meeting edges of said two sections to permit folding of the chart. It will be evident that the sections 2 may be equilateral if preferred, as shown best in Fig. 5.

While it will be apparent that each section may be extended to any desired length, I have in the principal figures indicated each as divided into five main divisions, numbered 4, 5, 6, 7 and 8 respectively, the divisions being formed by the heavy arc-shaped lines 9, 9, in pairs, to provide spaces 10, 11, 12, 13 and 14, extending the full width, or transversely, of each of the triangular sections or sectors 2, wherein may be written reference or index numbers (see Figs. 1 and 2) for all names appearing in the records, making them easily indexed. Each of the main divisions is ruled with lighter arc-shaped lines 15 to form subdivisions 16, 17, 18, excepting only the main division 4, in which but one arc-shaped line is employed. Each of the main divisions except division 4 is divided by heavy radial lines 19 into what I shall for the purposes hereof term minor divisions 30, and each of these divided by lighter radial lines 31 for the reception of written data. The number of subdivisions 16, 17 and 18 increases toward the outer portion or base of the triangle, thus practically utilizing the brace system, or system which is commonly used in tabulated pedigrees, without employing the great amount of space necessary and essential to such systems when on an ordinary undivided or rectangular sheet.

Fixed by suitable eyelets on the face of the border 20 of one or more of the sections 2 are photograph-holding strips 21 cut away as shown to provide pockets 22 for the reception of photographs. The border may be suitably ornamented if preferred.

The subdivisions 16, 17 are headed, in the first appearing or left hand division with the indicative words "Names", "Time", and "Place", and a portion of the spaces below are left blank to be filled in with appropriate data concerning such. At the left of the "Names" column are printed the initial letters "R", "O", and "R", indicating respectively, remarks, (or record,) occupation, and remarks, these being arbitrary. United by a brace at the lower left hand portion of said column is the abbreviated indication "S. or D. of", indicating son or daughter of. At the right of the brace are printed the abbreviations "O", "F", and "M", indicating respectively occupation, father, and mother. The letters "C" midway of the "Names" column indicate church or creed.

The initial letters "B", "D", and "M" at the left of the "Time" column indicate respectively birth, death, and marriage. "M" or "Mo" when elsewhere placed indicates mother, and "F", father. The ancestral names are placed in main division 4. The ordinals, numerically arranged, placed in the spaces provided by the lines 9, serve as indexes.

Figure 6:
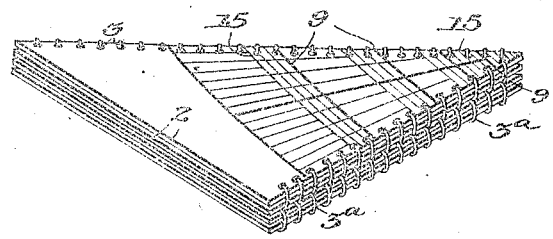

In Figs. 1, 2, 3, and 4 I have shown a chart intended and purposed for the descending scale. In Figs. 5 and 6 I have shown a chart embodying the main features of the one just referred to, but especially designed for the ascending scale. The sections 2 are shown as right-angled triangles and are provided with reinforced apertures by which they are secured together similarly to the sections shown in the principal figures. In the modifications both arc-shaped and radial lines are shown, and the main and sub-divisions are formed in the same manner as in the others, but somewhat differently arranged.

The method of filling out the chart will be evident from an inspection of Fig. 2. In Fig. 1 I have shown by dotted diagonal lines the manner in which direct descent is indicated. To illustrate: Beginning at the name indexed by the numeral "50" in the outer portion of the division 14, the diagonal line running thence to the numeral "36" indicates that the person whose name appears on the last enumerated line is the father of the one enumerated on line "50." This line of descent is shown as being carried out on the lines indexed "22," "13," and "1," respectively, the latter being the progenitor.

Having thus described my invention, I claim as new and desire to secure by Letters Patent the following, to-wit:

1. A chart of the nature described comprising a plurality of isosceles triangular sections, each suitably ruled with arciform and radial lines, the adjacent ends of all of the several sections but two flexibly united to those at each side thereof, and one edge of each of said two sections united to the adjacent section, whereby the several sections may be folded one on top of another, said sections forming an annular body when opened, but not adapted to wipe over each other in either opening or closing.

2. A chart of the character described comprising a plurality of isosceles triangular sections, the adjacent edges of all but two of said sections flexibly united to those at the sides thereof, and one edge of each of said two sections similarly united to the adjacent section, whereby the several sections may be folded one on top of another and into a compact body, but not adapted to wipe over each other, said sections forming an annular body when opened.

3. A chart of the character described comprising a plurality of appropriately ruled triangular sections, the adjacent edges of each thereof provided with apertures, eyelets reinforcing said apertures, and means for flexibly connecting each adjacent pair of eyelets, said sections forming an annular body when opened, and adapted to be folded one on top of another, but not to wipe over each other, to form a compact body.

4. A chart of the character described comprising a plurality of appropriately ruled triangular sections, the apexes of which triangles have a common center, the adjacent edges of each of said sections provided with apertures, eyelets reinforcing said apertures and means for uniting each adjacent pair of eyelets, said sections forming an annular body when opened, and adapted to be folded one on top of another, but not to wipe over each other, to form a compact body.

5. In a chart of the character described, a plurality of triangular sections having a common apex, said sections forming a circular member when open, and means for flexibly connecting said sections whereby they are adapted to be disposed one on top of another, each of said sections being divided into divisions of a number of concentric arcs which form concentric circles when the chart is open, and radial lines cutting said divisions, the number of said radial lines increasing toward the bases of the triangular sections.

6. A circular chart divided radially into a plurality of independent triangular sections having a common apex, and means for flexibly connecting said independent sections whereby said sections may be folded one above another into a compact triangular body.

7. A chart comprising a plurality of independent triangular sections having a common apex, said sections forming a circular body when opened, each of said sections divided into divisions by a number of concentric arcs, each of said divisions being cut by radial lines forming sub-divisions, the number of said sub-divisions increasing toward the bases of the triangular sections, a border having apertures therein corresponding in number and position to the adjacent sub-divisions, said apertures adapted to receive photographs, and means for flexibly connecting said triangular sections, whereby they may be folded one on top of another into a triangular body.

In witness whereof I hereunto affix my signature at Chicago, in the county of Cook and State of Illinois, this 22 day of Jan. 1912.

NORMAN C. GRAY.

Witnesses:
  KATHERINE McKENERICK,
  W. A. BUTTOGH.